UNITED STATES PATENT OFFICE.

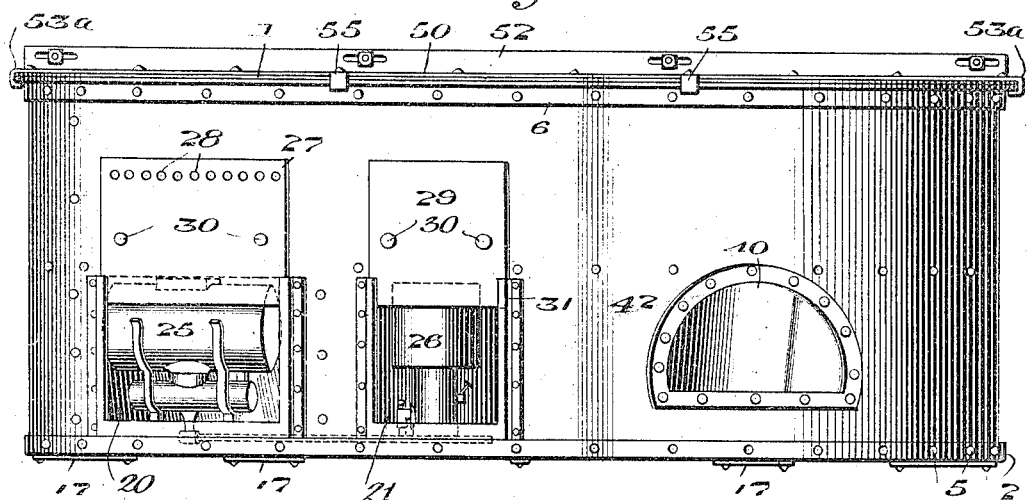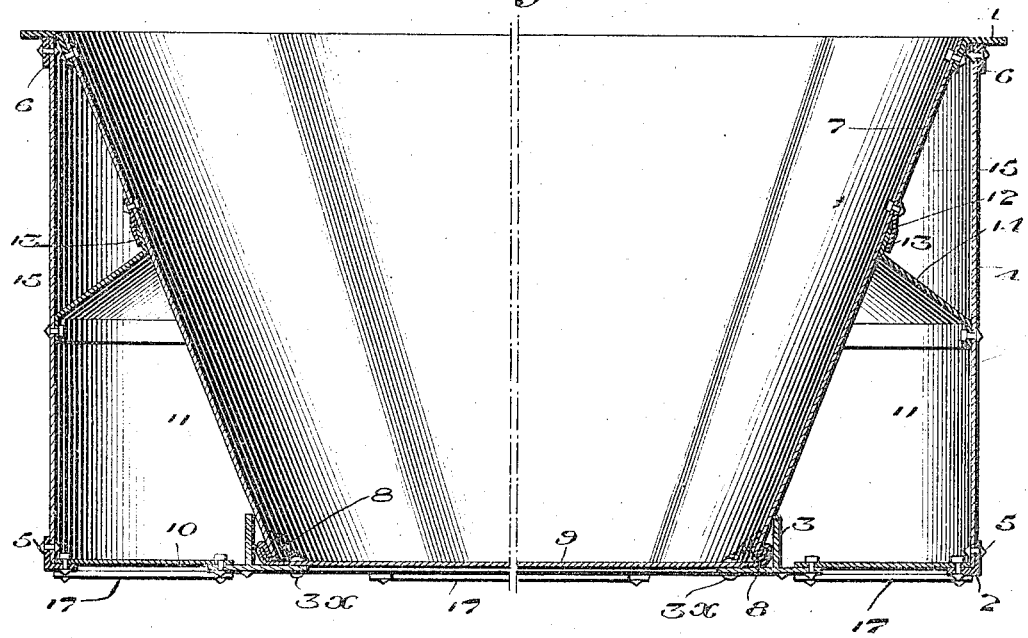

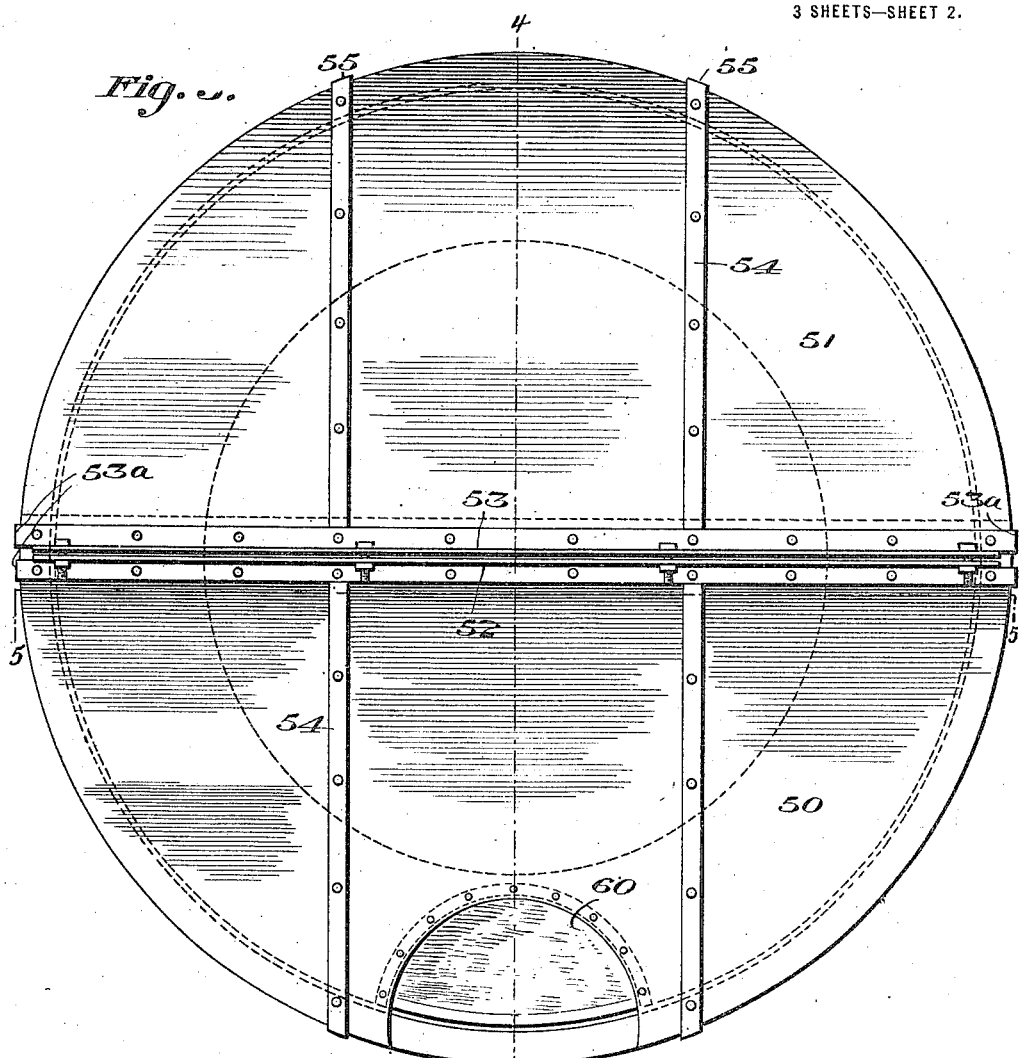

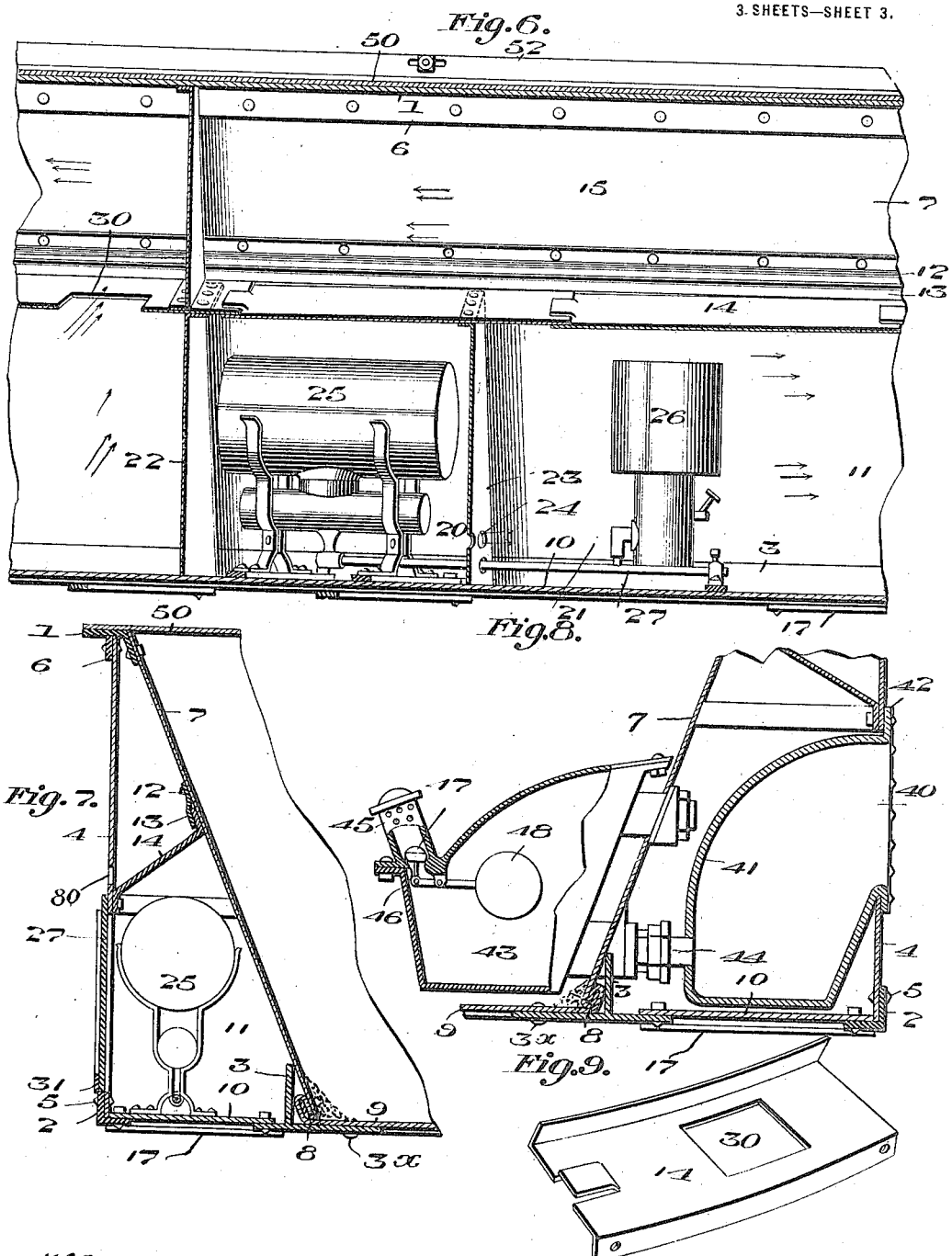

HANS H. IVERSEN, JURGEN IVERSEN, AND HENRY P. PAULSEN, OF SCHLESWIG, IOWA.

STOCK-WATERER.

1,238,678.   Specification of Letters Patent.   Patented Aug. 28, 1917.

Application filed October 9, 1916. Serial No. 124,593.

*To all whom it may concern:*

Be it known that we, HANS H. IVERSEN, JURGEN IVERSEN, and HENRY P. PAULSEN, citizens of the United States, residing at Schleswig, in the county of Crawford and State of Iowa, have invented new and useful Improvements in Stock-Waterers, of which the following is a specification.

Our present invention pertains to stock watering apparatus.

One of the objects of the invention is the provision of a tank constructed of sheet-metal in such manner that it is rigid and strong and yet is possessed of large capacity.

Another object of the invention is the provision of a tank embodying closure means for excluding foreign substances from the water and having the closure constructed and arranged in such manner that it serves the additional purpose of contributing to the rigidity and strength of the tank.

Another object is the provision of a stock watering tank having openings at different points so that small and large stock can drink with facility, and also having automatic means for controlling the supply of water to the trough in communication with the lower opening.

Another object is the provision of a stock watering tank embodying heating means, and means whereby the products of combustion are conducted around the tank in a tortuous course so that the water in the tank will be maintained in a heated state throughout the height thereof and consequently freezing of the water in winter will be precluded.

Other advantageous features of the invention will be fully understood from the following description and claims when the same are read in connection with the drawings, accompanying and forming part of this specification, in which:

Figure 1 is a front elevation of the tank constituting the best practical embodiment of our invention that we have as yet devised; the same being shown with the doors complementary to the fuel tank chamber and burner chamber in a raised position.

Fig. 2 is a diametrical, broken section, of the tank, on an enlarged scale.

Fig. 3 is a top plan view of the same.

Fig. 4 is a detailed diametrical section, taken in the plane indicated by the line 4—4 of Fig. 3.

Fig. 5 is a section taken at right angles to Fig. 4 and in the plane indicated by the line 5—5 of Fig. 3.

Fig. 6 is a fragmentary vertical section taken through the flues of the tank and also through the fuel tank chamber and the burner chamber, and showing the fuel tank and the burner in perspective and elevation, respectively.

Fig. 7 is a detail vertical section, taken through the fuel tank chamber and the flue above said chamber in a plane at one end of the fuel tank chamber.

Fig. 8 is a detail vertical section showing the watering trough for small stock and the means for controlling the supply of water to said trough.

Fig. 9 is a perspective illustrative of the partition plate between the lower and upper flues in which the opening is formed for the passage of products of combustion from the lower flue to the upper flue.

Similar numerals of reference designate corresponding parts in all of the views of the drawings.

Our novel tank comprises a body and a cover removably secured on the body and adapted to effectually exclude foreign substance from the water-containing portion cf the body.

As clearly shown in Fig. 2 the body of the tank comprises an angle iron rim 1, a base annulus 2, of right-angle form in cross-section, an inner annulus 3, also of right angle form in cross-section, a side wall 4, formed in one or a plurality of sections and preferably of galvanized sheet-metal and bolted at 5 to the upstanding portion of the annulus 2, an upper annulus 6 which surrounds and is bolted to the upper portion of the wall 4 immediately under the horizontal portion of the top rim 1, an inner inclined wall 7, also formed by preference in one or more sections of galvanized sheet-metal and bolted adjacent to its upper edge to the depending portion of the rim 1 and arranged at its lower edge within the upstanding portion of the inner base annulus 3, suitable solder 8, Fig. 2, arranged interiorly against the turned seam of walls 7 and 9 and within said annulus 3, a bottom wall 9, preferably of galvanized sheet-metal, bolted to the annulus 3 and serving in combination with the wall 7 to form the water-containing inner portion of the tank, a wall 10, formed by preference of a plurality of lapped plates bolted to the annulus 2 and the annulus 3 and serving in combination with the walls 4 and 7 to form the lower flue 11 of the tank, an annular plate 12 bolted to the outer side of the wall 7 at about the elevation shown and having the lower portion 13 spaced from the adjacent side of the wall 7, a partition 14 formed by preference of a plurality of lapped sheet-metal plates and serving in combination with the walls 4 and 7 to form the lower flue 11, before mentioned, and an upper flue 15. As illustrated, the partition 14 is flanged at its lower edge and bolted or riveted to the wall 4, and at its upper edge said partition is provided with an upwardly extending flange which is interposed between and securely held between the wall 7 and the spaced portion 13 of the annular plate 12.

If deemed expedient a plurality of spaced and radially disposed straps 17 may be provided above or below the annulus 2 and the annulus 3 at intervals around the bottom of the tank body; the said straps being bolted or riveted to the elements 2 and 3 and being adapted to lend increased strength and stiffness to the lower portion of the tank body. We would also have it understood at this point that when desired some of the said straps 17 may be utilized for the connection of the supports of the fuel-tank and the burner, hereinafter described.

The plates of which the partition wall 14 is formed are preferably joined in the manner shown in Fig. 6—i. e., each plate is provided at one end with a struck-up tongue 18, between which and the major portion of the plate the lapped end of the next adjacent plate is interposed and held as illustrated. When desired the said lapped ends of the plates forming the wall 14 may be connected together by bolts or other means, but this is not essential and is therefore not illustrated.

As best shown in Fig. 6 the tank body is provided at 20 with a fuel tank chamber, and at 21 with a burner chamber; the said burner chamber being in fact, one end of the lower flue 11. The chamber 20 is separated from the other end of said flue 11 by a transverse wall 22, and the chamber 20 is separated from the burner chamber 21 by a transverse wall 23 in the lower portion of which are a series of apertures 24. The fuel tank 25 in the chamber 20 is preferably of the type illustrated, though it may be of any other type without affecting our invention. The burner 26 in chamber 21 is connected through a pipe 27 with the tank 25, and said burner per se may be of the kind illustrated or of any other suitable construction adapted for use in our apparatus. The chamber 20 is provided with a door 27 in the upper portion of which are openings 28, and the burner chamber 21 is provided with a door 29. These doors 27 and 29 are equipped with knobs 30 and are movable vertically in guides 31 which may be attached to the wall 4 or may be formed integral with said wall in the discretion of the manufacturer.

When the doors 27 and 29 are closed and the burner 26 is lighted, air will enter the chamber 20 through the openings 28, and will pass from said chamber 20 through the apertures 24 into the chamber 21 so as to properly support combustion. From the burner, the heated products of combustion will pass through the flue 11 and around the tank body until said products bring up against the side of the wall 22 remote from the chamber 21, whereupon the products will pass upwardly through an opening 30 in the partition 14 and into the upper flue 15. In this latter flue the products of combustion will pass in reverse direction around the tank until they bring up against the opposite sides of the transverse wall 22, Fig. 6, at which point they will pass out of the flue 15 through opening 80, Fig. 7, and into the atmosphere. By virtue of the arrangement defined, it will be manifest that the products of combustion are carried around the lower portion of the tank body in one direction, and then are carried around the upper portion of said body in the opposite direction before they are permitted to escape from the tank body. From this it follows that throughout its height, the water-containing portion of the tank body will be adequately heated with the result that freezing of the water will be precluded.

At 40 is the opening through which small stock may drink, and at 41 is the trough in communication with said opening. The said trough is flanged at 42 for connection to the outer side of the wall 4, and inasmuch as the trough is formed of cast iron it will be manifest that the said flange will reinforce and protect the portion of the walls 4 against which it is lapped.

Water is supplied to the trough 41 from a float chamber 43 connected with the trough through a conduit 44, Fig. 8. The said float chamber is provided at 45 with a foraminous intake, and is also provided at 46 with a valve-seat with which coöperates a valve 47 controlled by a float 48. It will thus be seen that the trough 41 will be supplied at all times with a proper quantity of water, and that the supply will be replenished automatically at intervals as required.

As best shown in Figs. 3, 4 and 5, the cover of the tank comprises two semi-circular sections 50 and 51 which are preferably of sheet-metal. The section 50 is provided near its inner edge with an angular iron 52, and the section 51 is provided on its inner edge with a similar angular iron 53. It will also be noticed that the ends of the horizontal portions of said angle-irons are shaped into hooks 53ª. Reaching at right angles from the angle irons 52 and 53 are straps 54 which are fixed to the cover sections and terminate at their outer ends in hooks 55, Fig. 4. When the cover sections are positioned on the tank body the said hooks 53ª and 55 are engaged with the edge of the rim 1, and consequently when the lapped inner portions of the cover sections are drawn together by the bolts and nuts that coöperate with the slotted upstanding portions of the angle irons 52 and 53, the hooks by coöperation with the rim 1 will securely fix the cover in position.

At 60 the cover section 50 is provided with an opening through which large stock can conveniently drink. The said opening is bordered by a depending flange 61 which is designed to extend down into the water with a view to excluding the wind from the underside of the cover.

When the cover is secured on the tank body in the manner described, it will be observed that a tight joint is made between the cover and the rim 1, and also that the lapped inner portions of the cover sections form a tight joint calculated to exclude the air and assist in preventing freezing of the water.

It will be gathered from the foregoing that our novel tank is inexpensive in construction and well adapted to withstand the rough usage to which watering tanks are ordinarily subjected; also, that in cold weather the means described may be depended on to maintain the water in such a state that the same can be used to advantage for watering purposes.

The angle iron 3 is shown in Figs. 2, 7 and 8 as riveted at 3ˣ to the bottom wall 9.

Having described our invention, what we claim and desire to secure by Letters-Patent, is:

1. A stock watering tank having a water-containing portion, a lower flue surrounding the said portion, an upper flue also surrounding the water-containing portion, spaced walls forming a fuel-tank chamber and separating said chamber from the lower flue, one of said walls having apertures in its lower portion, a burner located in the lower flue at the opposite side of said apertured wall, with reference to the fuel-tank chamber, a fuel tank arranged in said chamber and connected with said burner, a wall intersecting the upper flue adjacent to the fuel-tank chamber, a wall between the lower and upper flues and having an opening connecting said flues and arranged at the opposite side of the latter chamber, with reference to the burner, vertical doors for the fuel-tank chamber and the burner, respectively, the door for the chamber being provided with air-inlet openings, and guides for said doors.

2. A stock watering tank having a central water-containing portion provided with a drinking opening, and lower and upper flues surrounding the water-containing portion and also having a wall between said flues provided with a permanently unobstructed opening connecting the flues and a transverse wall arranged at one side of and adjacent to said opening and permanently blocking the flues; the lower flue having an inlet for atmospheric air and the upper flue having an outlet for products of combustion located at the opposite side of said transverse wall, with reference to the opening in the wall between the flues, and adjacent to the transverse wall, heating means disposed in the lower flue at and adjacent to the opposite side of the transverse wall, with reference to the opening in the wall between the flues, a trough arranged in and isolated from the lower flue and having a drinking opening in communication with the atmosphere, a float chamber arranged in the water-containing portion and in communication with said portion, a float in said chamber, a valve controlled by said float and arranged intermediate the water-containing portion and the float chamber, and a conduit intermediate the float chamber and the trough.

3. In a tank, a body comprising a rim of angular form in cross-section, a base annulus of angular form in cross-section, a sheet-metal side wall connected to said annulus, and disposed at its upper end under and adjacent to the rim, an inner base annulus, of angular form in cross section, an inclined wall of sheet-metal connected to said rim, a sheet-metal wall interposed between the first-named base annulus and the second-named or inner base annulus and adapted to form the bottom of an annular space, and a sheet-metal wall carried by the inner base annulus and serving in conjunction with the inclined sheet-metal wall to form a central water-containing portion.

4. A tank comprising a body having an outwardly directed flange on its upper edge, in combination with a cover comprising two sections, hooks on the sections and adapted to engage said flange, and means for drawing the sections inwardly and connecting the same together.

5. In a tank, the combination with a body having an outwardly directed flange at its upper edge, of a cover comprising semi-circular sections, the inner portions of which are lapped, an angle iron on one section parallel to and in spaced relation to the inner edge thereof, an angle iron on the other section at the inner edge thereof, means connecting the upstanding portions of said angle irons, hooks at the ends of the angle irons and engaging the flange on the body, and straps connected to the sections and disposed at right angles to the angle irons and having hooks at their outer ends engaging the flange of the body.

In testimony whereof we have hereunto set our hands in presence of two subscribing witnesses.

HANS H. IVERSEN,
JURGEN IVERSEN,
HENRY P. PAULSEN.

Witnesses:

AUG. D. PAULSEN,
HUGO F. KLOTZ.

Copies of this patent may be obtained for five cents each, by addressing the "Commissioner of Patents, Washington, D. C."